United States Patent

[11] 3,625,810

[72] Inventor William M. Swartz
 195 Ivy Lane, Highland Park, Ill. 60035
[21] Appl. No. 41,244
[22] Filed May 28, 1970
[45] Patented Dec. 7, 1971

[54] DISPLAY LAMINATE
 6 Claims, 5 Drawing Figs.
[52] U.S. Cl. .................................................. 161/119,
 117/37, 156/85, 156/220, 161/113, 161/120,
 161/124, 161/410, 161/413
[51] Int. Cl. ...................................................... B32b 3/10
[50] Field of Search ............................................ 117/37;
 156/85, 220; 161/113, 119, 120, 124, 410, 413

[56] References Cited
UNITED STATES PATENTS
3,300,367 1/1967 Swartz ......................... 161/113
3,346,411 10/1967 O'Dell .......................... 117/11

Primary Examiner—William A. Powell
Attorney—Spector and Alster

ABSTRACT: A display device comprises a moisture-containing sheet of paperboard with films laminated to the opposite sides thereof. In predetermined areas the film on one side forms a moisture impervious layer while at those same areas the film on the opposite sides of the sheet is moisture pervious so that upon flexing and drying of the sheet and shrinkage of the fibers thereof, the sheet will warp in a direction in which the moisture impervious film is on the outside of a flexure of curvature. In other predetermined areas the films are moisture pervious and impervious, respectively, in a reverse fashion so that in those other areas the flexed sheet will warp in a direction opposite to the first-mentioned direction. Certain other areas may be embossed with reinforcement and made water impervious at both films to inhibit warpage. The foregoing are utilized to enhance the shape of a three-dimensional display in a programmed manner.

PATENTED DEC 7 1971
3,625,810
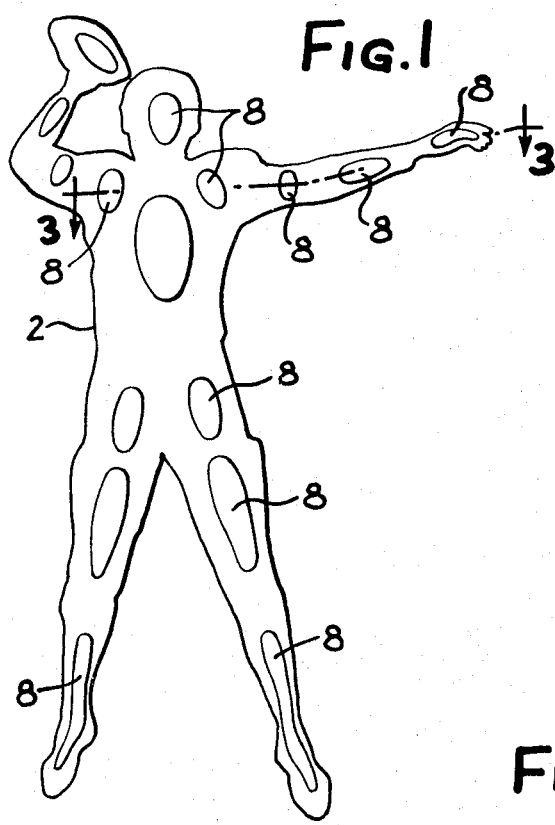
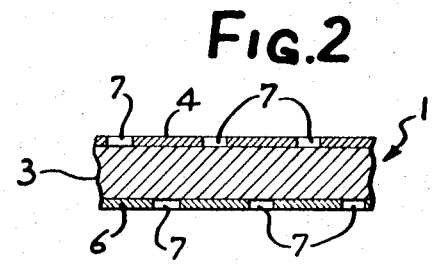
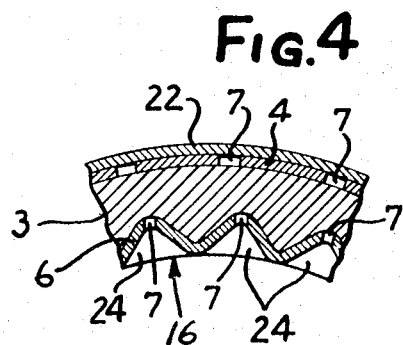
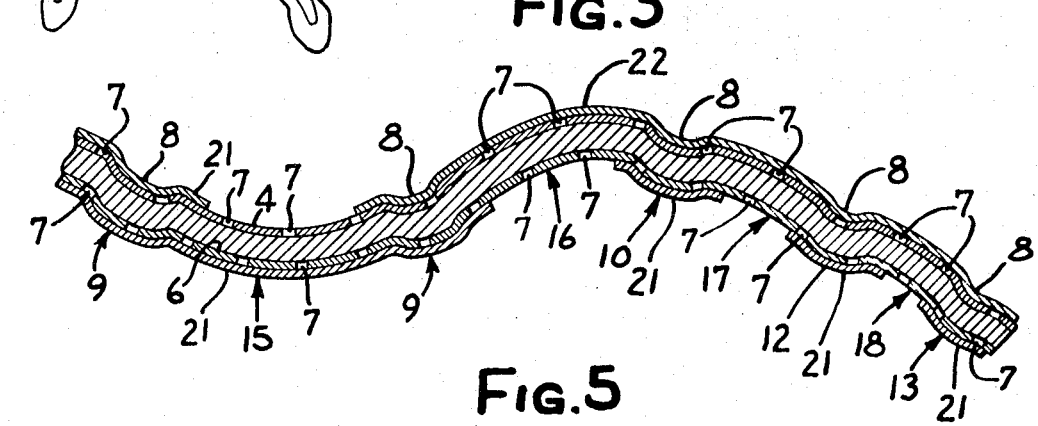
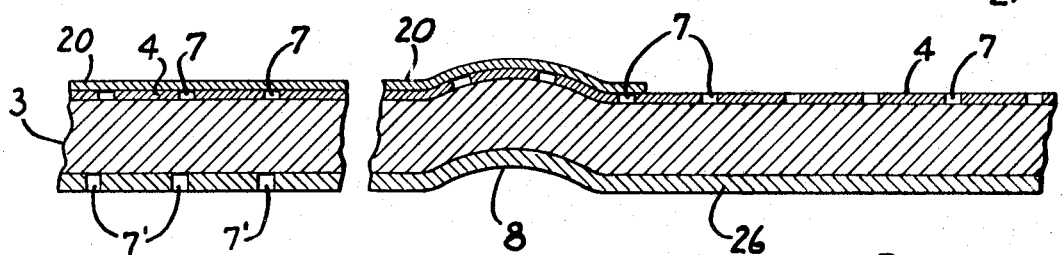
INVENTOR
WILLIAM M. SWARTZ
by: Spector & Alster
ATTYS.

DISPLAY LAMINATE

This invention relates to improvements in displays, such as advertising displays that are formed of a laminated sheet of self-sustaining material.

In my prior U.S. Pat. No. 3,300,367 there is described a display that is made of one or more sheets of paperboard, chipboard or the like having metal foil laminated to the opposite surfaces thereof. One of the foil sheets is thinner than the other, and the thinner sheet is vapor permeable due to the presence of microporous holes distributed therein. The thicker sheet is vapor impervious. Because the paperboard sheet has a relatively high moisture content the moisture escapes through the vapor permeable foil in the setup display but does not pass through the other foil sheet. As a result there is a shrinkage of the paperboard sheet initially at the vapor permeable foil, which results in a tendency of the sheet to warp in a direction such that the vapor impermeable sheet becomes the convex side of the curve of warpage. If the display is initially set up with the vapor impermeable sheet convex, the warpage tends to accentuate that convex surface. While the foregoing laminated sheet is highly successful in the manufacture of many types of displays, the fact that the warpage of the sheet is all in substantially the same direction results, in some complicated three dimensional displays, in there being warpage counter to the desired direction.

By the present invention there is provided a paperboard laminated sheet in which the direction of warpage of the sheet can be controlled in various localized areas over the sheet so that certain parts of the sheet can be caused to warp in one direction while other parts of the sheet can be caused to warp in the opposite direction. Furthermore, in certain parts of the sheet the warpage can be inhibited and the sheet strengthened thereat by suitable embossing. In this manner each display can be constructed so that warpage or lack of warpage and reinforcement can be custom designed into the sheet so as to impart a more realistic three-dimensional appearance to the display.

In accordance with this invention the laminated sheet is caused to dry from only one surface in certain areas while in other areas the sheet is caused to dry from only the opposite surface. In some areas the sheet may be prevented from drying from either surface and may be embossed thereat to prevent or inhibit substantially all warpage thereat. The locations of the areas of drying or no drying, as the case may be, will be predetermined by design of the sheet and will depend upon the configuration of the display. Furthermore, the localized warpage may be accentuated by a series of small embossings that do not significantly alter the physical appearance of the display, but yet serve to macerate the fibers of the sheet to enhance the flexibility of the sheet in the localized area.

The attainment of the above and further objects of this invention will be apparent from the following specification taken in conjunction with the accompanying drawing forming a part thereof.

In the drawing:

FIG. 1 is an elevational view of a setup display according to the present invention;

FIG. 2 is an enlarged fragmentary cross-sectional view of a piece of stock material that may be used in the fabrication of the display of FIG. 1;

FIG. 3 is an enlarged fragmentary sectional view taken approximately along line 3—3 of FIG. 1;

FIG. 4 is an enlarged fragmentary cross section showing a portion of a display and illustrating a further feature of this invention; and FIG. 5 is a fragmentary cross section of a flat (i.e. not set up) display in accordance with a modified form of this invention.

Referring now in more detail to the drawing there is shown in FIG. 2 a stock material 1 out of which the display 2 of FIG. 1 is fabricated. The stock material 1 is typical, but as will be seen is not the only material that may be used. The material 1 comprises a paperboard sheet 3 having sheets of light-reflecting aluminum foil 4,6 laminated to the opposite surfaces thereof. The paperboard, at the time of lamination, is self-sustaining but contains an appreciable amount of moisture, which may be of the order of 10 to 15 percent based on the total weight of the stock. The foils 4,6 completely cover the respective opposite surfaces of the sheet 3 and are quite thin so as to be pervious to the passage of water vapor. In one form of the invention the foils are each of a thickness of about 0.00035 inches. Commercially available aluminum foils of this thinness contain large numbers of randomly distributed holes 7, which are very minute and not discernible to the naked eye. They do, however, allow the passage of water vapor through the foil sheet. The paper chip board sheet 3 may be of the order of 0.024 inches thick.

The stock material 1 is blanked out and embossed to form a display 2, which by way of example is a football player preparing to throw a football. As in my aforementioned prior patent, the embossing may, if desire, include embossed lines that extend into the sheet 3 but do not rupture the foils 4,6. In addition, the display may be embossed with a number of struts hollow ribs 8 that extend part way into the sheet and cause bulges in the stock material. These ribs 8 form reinforcements tending to rigidify the display at and immediately adjacent to the ribs. 8.

In the example display 2 herein illustrated, certain parts are intended to warp forwardly, other parts are intended to warp backwardly, and other parts should be inhibited from warping. For example, the collar bone area 9, the upper arm 10, the lower arm 12 and wrist 13 should be regions where ribs are embossed to lend rigidity. The chest portion 15 should be convexly curved as viewed from the front of the display. The shoulder joint 16, elbow 17 and wrist 18 regions should be curved oppositely, i.e. concavely. The curvatures may be in varying amounts. For these purposes the covering films over the sheet 3 may include water impervious coatings in certain areas and be left uncoated or coated with water pervious coatings in other areas. These coatings may be of various colors in accordance with the nature of the display. Thus in the areas 9, 10, 11, 12, 13 water impervious coatings 21,21 may be applied to both foils 4,6. In the area 15, the water impervious coating 21 may be applied to the front foil 6 and the foil 4 left uncoated. In the areas 16, 17, 18 the front foil 6 may be left uncoated (or coated with a water pervious coating for decorative purposes) and the back foil 4 coated with a water impervious coating 22.

The display is ordinarily flat (except for the embossings) when it is shipped to the user, who thereafter sets up the display by bending the laminated sheet beyond its elastic limit so that it assumes the various concave and convex curvatures, previously described, without breaking the water impervious barriers, which are flexible enough to withstand the intended flexing. During storage and/or shipment, both sides of the display may be covered with a protective water impervious sheet which is stripped from the display just before setup. However, after setup of the display 2, the sheet 3 begins to dry by reason of moisture evaporating through the holes 7. This tends to shrink the sheet 3 in localized areas and produces controlled warpage, depending upon which side of the sheet (if at all) is exposed to the atmosphere through the holes 7 at given localized areas. Accordingly, the areas tend to warp in the direction of curvature in which they have been flexed, which tends to accentuate and increase the flexing as the display remains set up. Thus, for example, in the area 15 the drying of the sheet 3 is through the foil 4, causing the back side of the sheet 3 in the area 15 to dry and shrink faster than at the front side. However, in the areas 16, 17, 18, the drying of the sheet 3 is through the front foil 6, causing the front side of the sheet 3 in those areas to dry and shrink faster than at the rear side. In the rib embossed areas 9, 10, 12, 13 both foils are coated with water impervious coatings and drying at those regions is inhibited, thus inhibiting warpage thereat.

If desired the warpage and flexing of any desired areas may be enhanced by mechanical treatment of the laminate. In FIG. 4, for example, assume that it is desired to increase the flexibility of the area 16 of FIG. 3. If that is desired, the foil 6 may be embossed with small conical or prismatic embossings 24 which extend only part way into the sheet 3 but nevertheless serve to break or macerate the fibers of the sheet 3. These embossings 24 are not normally discernible except on close inspection and do not rupture the foil.

It is also possible to utilize as a stock material laminate which differs from that of FIG. 2 in that one of the foils 26 is about 0.001 to 0.002 inches thick and is totally water impervious. Such material may be used as the front side of the display where high luster or deeply drawn embossing of lines in the display is required. In that event the foil 26 may be perforated with a suitable die to form holes 7' in those areas where evaporation of moisture from the sheet 3 is desired. Opposite the formed holes 7' the foil 4 may be coated with a water impervious coating 20. In areas where the desired warpage of the laminate is such as to have the heavy foil 26 on the convex side, no coating of either foil is needed, although water pervious decorative coatings may be used, if desired.

The precise constructions herein shown are illustrative of the principles of the inventions.

What is claimed is:

1. A display representing a three-dimensional figure and comprising a sheet of paperboard material of the kind that is subject to shrinkage upon drying and having films laminated over the opposite surfaces thereof, a region of one surface of the sheet being exposed to the atmosphere through one film and a region of the opposite surface being exposed to the atmosphere through the other film, said paperboard sheet having a moisture content of such magnitude that it is subject to reduction of moisture by evaporation through said regions, the two regions being laterally displaced from one another, said films each being moisture impervious at the corresponding surface portions of the sheet that are opposite to the regions thereof that are exposed to the atmosphere, said sheet and films forming the laminate being sufficiently yielding to permit flexing thereof to form opposed curves of flexure at the two regions and with the moisture-impervious portions on the outsides of the respective curves of flexures, said flexing being of such amounts that the laminate at each curve of flexure does not return to its initial position but at the same time the water impervious portions remain uninterrupted and laminated to the sheet, the vapor permeable films at said regions having means controlling the rates of drying of the sheet at the regions so that the shrinkage at the respective regions tends to accentuate the respective opposed curves of flexures.

2. A display according to claim 1 having a series of small closely spaced embossings of a depth that are less than the thickness of the laminate and located at least at one of the regions to macerate the fibers of the paperboard and enhance the warpage thereat.

3. A display according to claim 1 having at least one embossing outside of said two regions, said embossing being of a depth that is greater than the thickness of a film and constituting a rigidifying structure for the display, and said films being water impervious at said embossing.

4. A display according to claim 1 in which the film at least at one of the moisture impervious portions comprises a layer of moisture pervious light-reflecting metallic foil that is covered with a water impervious coating.

5. An article of manufacture comprising a sheet of paperboard material of the kind that is subject to shrinkage upon drying, a film laminated to one surface of the sheet and being moisture impervious in one region and moisture-pervious in another region, a film laminated to the opposite surface of the sheet and being moisture impervious in the portion thereof opposite to and substantially coextensive with the said moisture pervious region and being moisture pervious in the portion thereof that is opposite to and coextensive with the first-mentioned moisture impervious portion, said laminate being sufficiently yielding to flex the sheet into areas of curvature with the moisture impervious film portions remaining unbroken and being on the outsides of the curves of flexure and with the flexing being of an amount such that the laminate does not return to its initial position, said moisture permeable regions constituting structures for controlling the drying of the sheet to accentuate the respective areas of curvature resulting from warpage of the sheet during drying thereof, and means comprising embossing outside of the two regions and forming a rigidifying structure for the laminate that resists warpage of the sheet in opposite directions in said embossing.

6. A structure according to claim 5 in which the laminate is moisture impervious at the sides thereof that are at the embossing.

* * * * *